April 13, 1937.  H. H. KEEN  2,076,727
PERFORATED CARD CONTROLLED ACCOUNTING MACHINE
Filed Aug. 8, 1930  4 Sheets-Sheet 2

April 13, 1937. H. H. KEEN 2,076,727
PERFORATED CARD CONTROLLED ACCOUNTING MACHINE
Filed Aug. 8, 1930   4 Sheets-Sheet 3

Inventor
H. H. Keen
W. M. Wilson
By his Attorney

FIG.5.
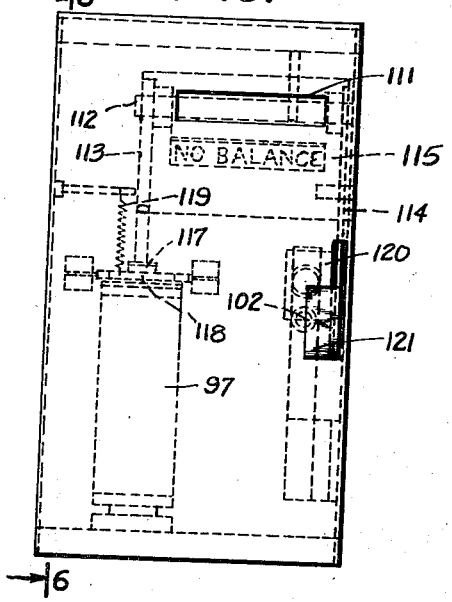
FIG.6.
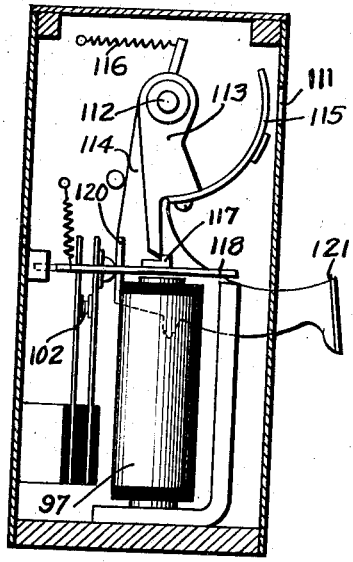
FIG.7.
| ACCOUNT N° | DEBIT BALANCE B/F | CREDIT BALANCE B/F | CURRENT DEBIT TOTAL | CURRENT CREDIT TOTAL | DEBIT BALANCE | CREDIT BALANCE |
|---|---|---|---|---|---|---|
| 121 | 5280 | | | | | |
| | | | 7642 | | | |
| | | | 1010 | | | |
| | | | 24 | | | |
| | | | | 421 | | |
| | | | | 22 | | |
| | 5280 | | 8676* | 443* | 13513* | |
| 121 | | | 7642 | | | |
| | | | 1010 | | | |
| | | | 24 | | | |
| | | | | 421 | | |
| | | | | 22 | | |
| | | | 8676* | 443* | 8233 NB | |

Patented Apr. 13, 1937

2,076,727

UNITED STATES PATENT OFFICE 2,076,727

PERFORATED CARD CONTROLLED ACCOUNTING MACHINE

Harold Hall Keen, Letchworth, England, assignor, by mesne assignments, to International Business Machines Corporation, New York, N. Y., a corporation of New York Application August 8, 1930, Serial No. 473,960
In Great Britain September 16, 1929

21 Claims. (Cl. 235—61.7)

This invention relates to record card controlled statistical machines by the aid of which, for example, the summations of the data recorded on a batch of record cards pertaining to a particular period may be obtained.

In many cases it is desirable to include a special card containing basic data which should be included in the summations if a true statement of the state of affairs at the end of the period is to be obtained. Thus, for example, when the machine is employed to prepare statements of accounts, the "balance brought forward" from the previous accounting period must be added to the amounts pertaining to the current period in order to obtain the state of the account at the end of the current period. This "balance brought forward" is recorded on a special card which may be handled in the same way as the cards pertaining to the current period but more valuable information may be obtained by handling the items recorded on the special card in a different manner from the current items recorded on the other cards. By giving the special card special treatment a statement may be prepared showing the balance brought forward, total or totals of the amounts pertaining to the current period and the balance to be carried forward to the next period.

In another example when statistics relating to sales effected during a particular period are being prepared it is convenient to have a statement comparing them with the sales budgeted for. This may be done by recording the latter information on a special card which is to be specially treated by the statistical machine.

In order to simplify the explanation of this invention, it will be assumed that the statistical machine is to be employed in the preparation of statements of accounts but as indicated above a machine embodying the invention can be employed for the preparation of other statistics.

It is essential, if a true statement is to be obtained, that all of the cards be present in the batch to be tabulated. It is possible, by taking care to keep together the newly prepared cards representing the transactions for the current period, to insure that all are present in the batch. It is difficult, however, to ensure the presence of the special cards on which the "balance brought forward" is recorded as, due to errors in filing the special cards at the end of the previous period or failure to prepare such a card, one of them may be absent thereby causing erroneous totals when the cards are tabulated.

When an account is opened during the current accounting period there will be no balance to be brought forward, therefore, it must be made a rule, in order to secure accurate results and reduce the number of checking operations, to prepare such a special card with zero amounts recorded therein. This rule is necessary since the person preparing the statistical report otherwise has no means of knowing whether the absence of the special card is due to an error or is due to the fact that there is no reason for the existence of such a special card.

According to the present invention there is provided, in a record card controlled statistical machine, means for detecting the presence or absence of a special card in a batch of cards irrespective of the position occupied by said card in the batch, which means comprises in combination, card reading elements cooperating with a hole or group of holes so placed on the card as to denote that such card is to be treated as a special card, and a recording and/or signalling mechanism which is operable to give a record and/or make a signal under the control of the card reading elements.

When the statistical machine is of the kind having printing mechanisms for printing on a record sheet lists of, and/or the totals of, the items read from the cards, the recording mechanisms may comprise auxiliary printing mechanisms may comprise auxiliary printing mechanism arranged to print on the record sheet an indication of the presence in, or absence from, a batch of a special card. Thus, when the machine is employed in the preparation of account statements, it is preferred to arrange the auxiliary printing mechanism to print "N. B." (signifying "no balance") when a batch of cards does not contain a "balance brought forward" card.

The machine may be provided with signalling mechanism comprising means operable to stop the machine if the special card is absent from the batch, with or without an indicator for giving a visual indication of such absence.

Preferably the recording or signalling mechanism is so arranged that it is normally operable and is so controlled by the card feeding elements aforesaid that it is rendered inoperative if said elements encounter the hole or group of holes aforesaid in the special card. Thus the auxiliary printing mechanism aforesaid may be arranged so that it is operated automatically after the last card of the batch has been read unless the card reading elements encounter the hole or group of holes denoting a special card.

A machine embodying these and other features of this invention will now be described, by way of example only, with reference to the accompanying drawings in which:

Figs. 1 and 2 combined form a circuit diagram for the machine, Fig. 1 being placed above Fig. 2.

Fig. 5 illustrates the construction of the signal device employed in the machine.

Fig. 6 is a cross-section on the line 6—6 of Fig. 5 and

Fig. 7 shows a portion of a record sheet printed by the machine.

Like reference numerals indicate like parts throughout all the figures of the drawings.

In the following description the invention will be described in connection with a machine of the general type described and claimed in copending application Serial No. 119,803, filed July 1, 1926, by J. W. Bryce now Patent No. 1,950,475.

Figure 4:
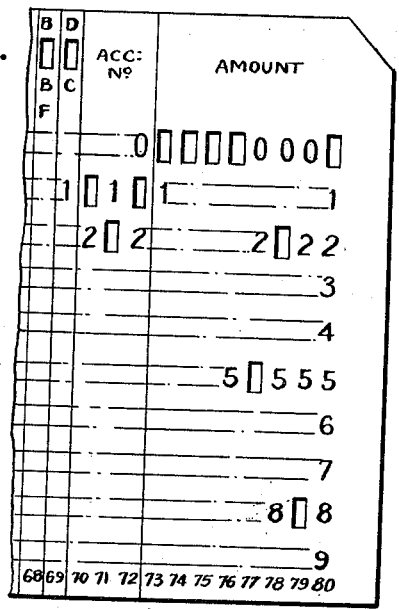
Fig. 4 shows a portion of a credit "balance-brought-forward" card.

The present machine is provided with an upper set of card reading brushes 10 and a lower set 11 which read each card in succession and automatic group control mechanism which compares "group" holes on two successive cards (in the present case holes representing an account number, see Fig. 4) and initiates an automatic total taking operation if these holes do not agree on successive cards. The machine is also provided with six accumulators or counters C1 to C6 on which amounts read from the cards can be accumulated and which can be employed to obtain the balance, whether positive or negative between positive (credit) amounts and negative (debit) amounts read from the cards. The accumulators can be reset to zero either automatically under the control of the group control mechanism or by pressing a key and simultaneously the totals can be printed by printing mechanism. The printing mechanism can be employed to print a list of the items entered (listing) or disabled to tabulate items without listing of such items (tabulating) as desired.

The usual card feeding devices are provided for feeding the groups of record cards past the card reading brushes and may be of the type shown and described in Letters Patent No. 1,762,145, granted June 10, 1930 to G. F. Daly and R. E. Page. Since the construction and operation of the card feeding devices is now well known in the art it is not thought necessary herein to go into detail regarding them.

The machine is driven by a tabulating motor TM (Fig. 1) of the two speed kind described in detail in Letters Patent No. 1,762,145. Power is supplied to the motor and other parts from two main lines 75 and 175 and the motor may be started by depressing a start key ST which establishes a starting circuit as described in Patent No. 1,762,145 aforesaid. Once the motor has started, it is energized over a circuit extending from the main line 75, through the motor, a card clutch magnet 70, a motor relay 71, upper card lever contacts UCLC, motor control relay contacts 72, stop key contacts SP and cam contacts P3 to the other main line 175. The magnet 70 controls the well known card feed clutch which couples the card feeding mechanism to the motor TM so that cards are fed so long as the magnet is energized.

The motor circuit may be opened in three ways, namely: (1) by depressing the stop key thus opening the contacts SP, (2) when the last card passes the upper brushes 10 and the contacts UCLC (which are ordinarily closed by the passage of cards past the upper brushes) open; and (3) automatically under the control of the group control mechanism by the opening of the relay contacts 72.

In the second case the motor circuit is maintained for a further card cycle by cam controlled contacts C3 and L4 if the machine is listing or by cam controlled contacts T1 if it is tabulating to ensure the last card being taken through the lower brushes. When the motor stops the machine is ready for a reset and total printing cycle which will occur automatically if a switch 74 is closed or can be initiated by depressing a key R if the switch 74 is open.

The resetting and total printing mechanisms are driven by a reset motor RM through a one revolution clutch controlled by a reset magnet 77 in series with the motor. The energization of the motor RM and magnet 77 is controlled by contacts 170 which close as the result of the deenergization of the card feed clutch magnet 70.

If the switch 74 is closed and the motor circuit opened so that the magnet 70 is deenergized, a circuit is established from the line 75 through the motor RM, the reset clutch magnet 77, signal contacts 102 (normally closed), the contacts 170 closed since the magnet 70 is deenergized, cam contacts L1, the contacts SP, and the contacts P3 to the line 175. On being energized the magnet 77 closes contacts 76 to provide a holding circuit for the motor and clutch magnet through contacts L2 to the line 175. Immediately afterwards contacts P1 close, connecting the reset motor RM directly between the main lines 75 and 175, thus short circuiting the magnet 77 and allowing the reset clutch to disengage at the end of a revolution. The manual closure of the reset contacts R brings about the same series of operations.

It will be helpful in understanding the general operation if it be borne in mind that certain cam operated contacts designated by the letters C, L, and T are operated by the motor TM during card sensing cycles while cam contacts designated with the letters P and LP are operated by the motor RM during total taking and resetting cycles as in Patent No. 1,762,145.

At the end of a reset cycle normally open contacts P4 close momentarily and the motor TM is restarted automatically and tabulating or listing is resumed, providing automatic restarting switch 74a is closed. For the present purpose it will be assumed that the switch 74a is closed. It will be noted that a rest cycle will not occur and the machine will stop if the signal contacts 102 are open when the circuit for the motor TM is opened automatically as the result of a change of group. These contacts are opened under certain circumstances as will be explained later.

The automatic control mechanism is in general substantially similar to that described briefly in Letters Patent No. 1,762,145 and in detail in Patent No. 1,822,594, and is well known. British Patent No. 299,014 and the corresponding United States application, Serial No. 227,127 filed October 19, 1927 describes and claims automatic group control mechanism adapted to function on two changes of group number. The circuits included in said mechanism will be traced briefly to assist in an understanding of the present invention.

A number of control magnets 80 are provided and each is in series with a pair of contacts 83 which serve to prevent sparking at the brushes. Each magnet can be plugged in series between an upper brush 10 and the corresponding lower brush 11 by means of plug sockets 78 and 79 and in Figs. 1 and 2 of the drawings the three magnets 80 shown are presumed to be in series with the three left hand upper and three left hand lower brushes. When energized, each magnet closes a pair of contacts 81 which contacts are connected in series to the main line 175 and in parallel with minor cam contacts T5 and switches 89, 90, the latter being in series. Plug sockets 82 are provided, one between each pair of contacts 81, so that certain of them (in the present case, three) can be connected in parallel with either major cam contacts T4 and a switch 89 or minor cam contacts T5 and the switch 90. A major control circuit extends from the wire 175, through contacts T4, through a control magnet 87, major relay magnet 86, the front contacts 84 of major relay contacts 84—85 to the line 75 while a minor circuit extends from the line wire 175, through contacts T5, through minor relay magnet 88, the front contacts 184 of minor relay contacts 184—185 to the line 75. The relay magnets are arranged to hold their front contacts closed so as to maintain these two circuits.

Record controlled machines of the type disclosed in Patent No. 1,762,145 are in practice equipped with at least eight control circuits including eight magnets 80 and eight contacts 81. For sake of simplicity of description only six contacts 81 have been shown in Fig. 1 and in said figure only the three control circuits containing magnets 80 associated with the three lower sets of contacts 81 have been illustrated as the other three control circuits associated with the upper three contacts 81 are not needed in the specific example described herein.

The group control circuits through 84 and 184 are established during reset cycles when contacts LP6, LP8 close momentarily. This group control is, in some respects at least, a duplication of the one described in Patents Nos. 1,762,145 and 1,822,594. It differs from the control of Patent No. 1,933,308 mainly in that the major and minor total cycles are simultaneous and not successive as in the latter patent. Cam contacts LP6, LP8 close together during each reset cycle and reenergize minor relay 88 or both relays 88, 86 according to whether the minor relay alone, or both major and minor relays were previously deenergized as a consequence of a change in group. Substantially the same general effect is produced by lower cam contacts P3 of Patent No. 1,762,145 and LP6, LP7, LP8 of Patent No. 1,933,308.

In an illustrative example to be considered later the cards are sorted into minor groups each containing all the cards relating to a particular account and each card contains in columns 70, 71 and 72 (see Fig. 4) the number of the account to which it relates, but there are no major groups. The upper and lower brushes cooperating with these columns are plugged to the three control magnets 80 shown and the switch 90 is opened. The switch 89 is closed in order to short circuit the major group contacts 81 (which are the upper three pairs 81, Fig. 1) and put the major control section out of action. A plug wire (shown in broken lines, Fig. 1) is inserted in a plug socket connected to switch 89 and the plug socket 82 between the third and fourth plug sockets 82 from the top in Fig. 1. If two successive cards have the same group number, each of the three upper brushes will encounter a hole at the same time in a card cycle as the corresponding lower brush encounters a hole of the same value and each of the magnets 80 will be energized and will close its contacts 81. Contacts 81 are normally latched in open position as in Patent No. 1,822,594 but are unlatched and allowed to close whenever the associated magnet 80 is energized. As in said patent, a cam restores all the contacts 81 to latching position at the end of each card cycle. Thus, towards the end of the card cycle the minor contacts 81 will all be closed and will maintain the minor control circuit when the contacts T5 open at the end of the cycle. If the two cards belong to different groups, one or more of the magnets 80 will not be energized and the corresponding contacts will remain open so that the minor control circuit will be broken at the end of the cycle. Incidentally the circuits are arranged so that, when both major and minor controls are being employed, a change in a minor group breaks the minor circuit only and a change in a major group breaks both circuits.

The circuit for the major relay when energized extends from the line wire 75, the front contacts of the major relay 84, the magnet 86 of said relay, magnet 87, and cam contacts T4 to the line wire 175. If the switch 89 is closed the circuit will be carried through said switch when the cam contacts T4 open. If the switch 89 is open the circuit for the relay magnet 86 may extend from said magnet in series through the upper three contacts 81 over a suitable plug wire shown in dotted lines in Figure 1 inserted between a plug socket connected to the switch 89 and a plug socket between the third and fourth pairs of contacts 81, counting from the bottom, provided all the upper three contacts 81 are closed. Since the circuit for the magnet 88 of the minor relay must extend through either cam contacts T4 or the upper three sets of contacts 81 when the switch 89 is open, it is clear that the failure of any of the upper three contacts 81 to close during any card cycle will cause the circuit for the magnet 88 to become broken when the cam contacts T4 open, irrespective of whether or not any of the lower three pairs of contacts 81 may have been opened. It is clear that the opening of one or more of the upper three sets of contacts 81 will cause both the magnets 86 and 88 to become deenergized when the cam contacts T4, T5 open. On the other hand if one or more of the lower three sets of contacts 81 open only the magnet 88 becomes deenergized. In the embodiment of the invention described herein only the lower three sets of contacts 81 are to be used, consequently, the switch 89 will be considered as in closed position, thereby holding the circuit through the magnet 86 once it is set up regardless of whether or not any of the upper three sets of contacts may fail to close and regardless of the opening of cam contacts T4.

When the minor control circuit is broken, the magnet 88 becomes deenergized so that the front contacts 184 open and the back contacts 185 close. A circuit is then completed from the main line 75 through the contacts 185, a resistance 111, a motor control relay magnet 73 and a relay magnet 110 to the main line 175. The magnet 73 when energized opens its contacts 72 so as to interrupt the energizing circuit for the motor TM and to bring about a reset and total printing cycle in which the minor accumulators are reset. The interruption of the major control circuit has the same effect but, in addition, deenergizes the magnet 87 which normally holds contacts 91 open so that these contacts close.

At the beginning of the reset and total printing cycle cam contacts LP9 and LP10 close and a circuit is formed from the line 75 through the contacts LP9 and LP10, zero button magnets 92 and the contacts 91 to the line 175. The magnets 92 are thus energized and actuate clutches to couple the accumulators to the reset motor so that all major accumulators are reset with the minor accumulator. At the end of the reset cycle cam contacts LP6 and LP8 close to reenergize the magnets 86 and 87 and reestablish the major and minor control circuits.

In the present machine the items are distributed to particular accumulators or groups of printing devices according to their classification as either debit or credit items. This distribution is controlled through the medium of an X or a Y hole punched in a particular designation column. The balance between the credit and debit, irrespective of which is preponderant, is obtained by means of a subtraction operation, the broad principle of which is explained fully in Patent No. 1,950,475 and may be illustrated as follows:

Assume that, in a group of five cards representing certain transactions taking place relating to an account number 121, the 1st, 2nd and 3rd cards are debit cards holding amount 7642, 1010 and 24 respectively and the 4th and 5th are credit cards holding the amounts 421 and 22 respectively.

The debit cards would bear the designation "Y" by a hole in the twelfth position in the particular designation column (in the present case in column 69, Fig. 4) and the credit cards "X" by a hole in the eleventh position. The following distribution would take place when these cards are tabulated:

| Counter No. 3 debit total | Counter No. 4 credit total | Counter No. 5 debit balance | Counter No. 6 credit balance |
| --- | --- | --- | --- |
| 000007642 | | 000007642 | 999992358 |
| 000001010 | | 000001010 | 999998990 |
| 000000024 | | 000000024 | 999999976 |
| | 000000421 | 999999579 | 000000421 |
| | 000000022 | 999999978 | 000000022 |
| Total 000008676 | 000000443 | 000008233 | 999991767 |

It will be seen the counter 3 holds the total debit amount, the counter 4 the total credit amount, and the counter 5 holds the balance between the two, in this case a debit balance of 8233. The means for obtaining this result are explained fully in the specification referred to, but a brief outline will be given with reference to Fig. 2.

Figure 2:
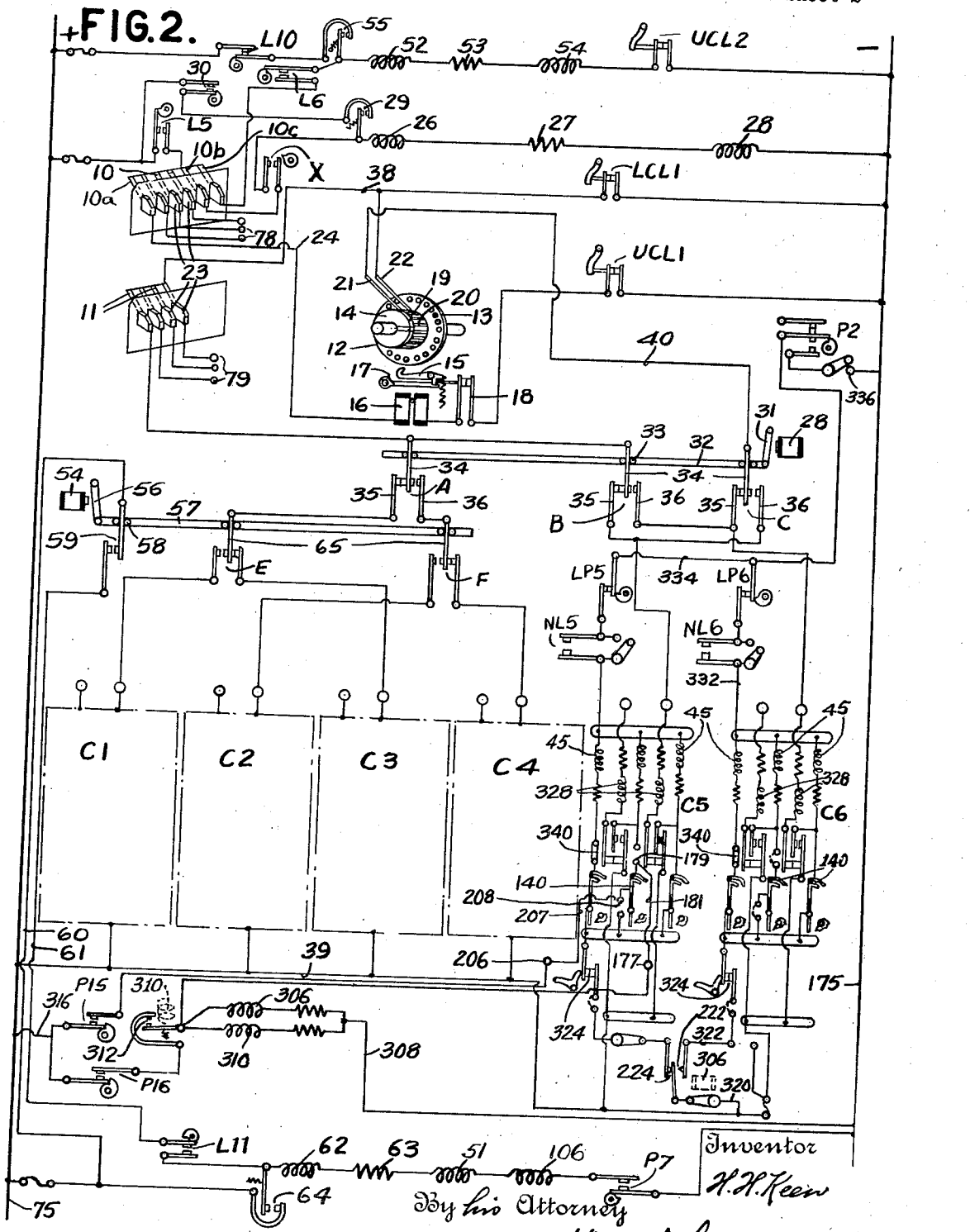

In Fig. 2 only the circuits and parts necessary for entering one denomination of the amount are shown in order to avoid complication since they are the same for each denomination. The counters employed are of the well known Hollerith type fully described in Letters Patent No. 1,307,740 and No. 1,534,531, and need not be described in detail herein.

All the cards are read by the upper brushes 10 and lower brushes 11, one card cycle apart. At the upper brushes the impulses resulting from holes being read are taken to a translator 12 and stored for one card cycle, the reading being inverted into complementary values and given out in that form during the subsequent cycle to the counters arranged to receive them.

The translator is of the kind described in detail in pending application Serial No. 327,037, filed December 19, 1928 by Charles Campbell, and also in the corresponding British patent specification No. 288,516, wherein it is referred to as an "impulse changing device", and comprises a disk 13 and a commutator 14 both driven in synchronism with the card feed to make one revolution for each two card cycles. The disk and commutator structure is in duplicate so that one half may be set up while the other half is emitting the impulse set up during the preceding card cycle. The disk carries, on each half thereof ten normally open pairs of contacts (not shown) one pair for each digit, and one of these pairs is closed by a contact tripping lever 15 when a magnet 16 is energized. When energized, this magnet attracts its armature 17 which moves and unlatches the tripping lever 15, and this lever is then moved upwards by a spring into position to close the pair of contacts which are momentarily in operative relationship to the lever. Incidentally the tripping lever as it moves upwards opens a pair of contacts 18 in the circuit for the magnet 16. The pair of contacts thus closed remains closed until the end of the succeeding card cycle. On each half of the commutator is a slip ring 19 traversed by a brush 21 and ten insulated segments 20 (one for each digit) traversed by a brush 22 in synchronism with the card feed so that the 9 segment makes contact with the brush 22 when the 9 holes in the cards are being read and so on. One contact of all the pairs in the disk 13 is connected to the slip ring 19 and each of the other contacts is connected to the segment 20 allocated to the complement of the digit to which the pair of contacts is allocated. A switch is closed in one half of the structure during one card cycle and the connected commutator segment 20 is engaged by the brush 22 during the next cycle when an impulse is emitted timed to represent the complement of the digit corresponding to the closed contacts. At the end of the latter cycle the closed contacts are re-opened. It will be understood that a complete translator section as described above is provided for each denomination of the amounts to be entered.

As described in application Serial No. 327,037 and British patent specification No. 308,829, the section handling the units denomination is arranged to emit the tens complement of a digit set up on it while the other sections emit the nines complements.

When on the passage of a card through the upper brushes, the brush encounters a hole, an impulse is transmitted over the following circuit: From the positive main line through cam contacts L5, a brush 10a, a cooperating block 23, a line 24, the translator magnet 16, the translator contacts 18, upper card lever contacts UCL1 to the negative line. Energization of the translator magnet results in the closure of the pair of contacts corresponding to the hole just read as previously explained.

At the upper brushes the designating column is also being read and in the event of an "X" hole (signifying a credit item) being present a circuit is set up as follows: From the positive line, through cam contacts L5, a brush 10b and a block 23, a cam contact X (closed to cover the X hole position only), a relay magnet 26, a resistance 27, a distribution magnet 28 to the negative line.

The energization of the relay magnet 26 causes the closure of associated contacts 29, and a holding circuit is set up via cam contacts 30, which at this moment would be closed to accept an "X" set up, and which are maintained closed until "0" is reached in the ensuing card cycle.

The energization of the distributing magnet causes the anti-clockwise movement of an armature 31, to which is attached a rod 32, carrying pins 33. These pins cooperate with the movable contact arms 34 of three distributing switches A, B and C. The arms are normally in contact with the left hand contacts of the switches and are moved to the right to engage the right hand contacts when the armature is attracted and shifts the attached rod. The arms 34 of the switches A and B are connected in parallel to a corresponding lower brush while that of the switch C is connected to the brush 21 of the corresponding section of the translator.

The left hand contact 35 of the switch A is connected through switch E to the appropriate denominational element of the current debit total counter C3, while the right hand contact 36 of this switch is connected through switch F to the current credit total counter C4, the left hand contact 35 of the switch B and the right hand contact 36 of the switch C are both connected to the debit balance counter C5, while the other two contacts of these two switches are connected to the credit balance counter C6.

The card which contains a credit amount is read on reaching the lower brushes and the true reading is dealt with by the following circuit: From the negative line, through lower card lever contacts LCL1, a line 38, a lower reading brush 11 and block, a line, contact arms 34 of the switches A and B, right hand contacts 36 of the switches A and B, and thence to the credit total and credit balance counters C4 and C6 respectively, and so to the positive line via a common return line 39. Coincidentally with this, the stored inverted reading held by the translator is given out by means of a circuit extending from the negative line through the lower card lever contacts, translator distributor brushes 21 and 22, a line 40, contact arm 34 of the switch C, the right hand contact 36 of the switch C, and the debit balance counter C5 to positive line.

In the case of a "Y" designated card (debit) the circuit through the relay and the distributor magnet, would not be energized, and therefore the distributor arms 34 of the switches A, B and C remain in their normal position so that the reading from the lower brushes is diverted into the debit total and the debit balance counters C3 and C5 whilst the complementary reading from the translator is switched into the credit balance counter C6. This result will be a true account of a period's transactions, but it may be necessary to take into consideration a "brought forward" balance from a previous period.

As explained above, the classification of an amount is designated by the position of a hole in a particular designation column, X signifying credit, and Y or the absence of any designation hole, debit. So in a like manner can the particular kinds of transactions all relative to one account be designated in a further designating column, such as "Purchase", "By cash", "Journal entry", "Balance brought forward", etc., each one having its special index position in that column. It is however, necessary, since a "balance brought forward" does not belong to the current period, to indicate it on a separate accumulator or accumulators, so as to show finally on the printed record the "balance brought forward" amount independently and separately from the current items, but at the same time it being accounted for in the new balance.

Assume that the card illustrated in Fig. 4 is added to the five cards previously considered. This card has a "Y" hole in column 68, denoting, that it is a "balance brought forward" card, a Y hole in column 69, denoting that it carries a debit amount, 121 in the account number field and 5280 in the amount field. The six cards will be distributed in the manner tabulated below, the "balance brought forward" card being given preferential treatment.

| Balance B/F debit No. 1 | Balance B/F credit No. 2 | Current debit total No. 3 | Current credit total No. 4 | Debit balance No. 5 | Credit balance No. 6 |
|---|---|---|---|---|---|
| 000005280 |  | 000007642<br>000001010<br>000000024 | 000000421<br>000000022 | 000005280<br>000007642<br>000001010<br>000000024<br>999999579<br>999999978 | 999994720<br>999992358<br>999998990<br>999999976<br>000000421<br>000000022 |
| 5280 |  | 8676 | 443 | 13513 | 999986487 |

As explained above the absence of the "brought forward balance" would result in an incomplete return although the record of the current transactions would be correct.

In the case of a new account being opened during the accounting period, there can be no "balance brought forward", from a non-existant previous period, but a "balance brought forward" card bearing zero perforations in the amount field must be included in the particular batch of cards representing this account. By this means the rule (previously stated) that all accounts must hold a balance brought forward card is enforced.

The present machine is arranged to detect whether there is a "balance brought forward" card included in each group and to indicate the absence of such a card from a group either (a) by printing "N. B." (no balance) against the total of the group or (b) by stopping the machine. The manner in which the machine detects a "balance brought forward" card and prints "N. B." when it fails to detect such a card in a group will be described first.

Figure 3:
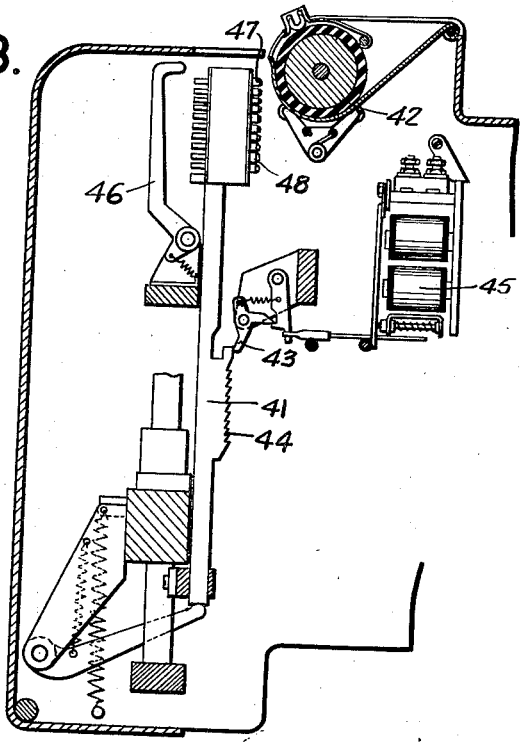
Fig. 3 shows the printing mechanism employed in the machine.

The printing mechanism of the statistical machine consists, as usual, of seven banks of type bars, each bank containing ten bars 41 (Fig. 3), the first bars of which on banks 3, 4, 5, 6 and 7 carry each a single asterisk type 47 which is used on total printing only to indicate a total as against ordinary listed items which need no such symbol to denote them.

The printing mechanism is of the well known form described in Reissued Letters Patent No. 16,304 and it will be sufficient to explain that all the bars 41 are raised together past a platen 42 and that each bar is arrested when the required type on it is at the printing line by an associated detent 43, engaging a rack 44 on the bar. Each detent is released to engage its rack when an associated magnet 45 is energized. Printing from the type which are on the printing line is effected by hammers 46. The magnets 45 control the usual amount printing type bars. The magnets for controlling the asterisk are designated 45a, 45b in Fig. 1.

In the present machine a further type 48 is placed on the asterisk type bars of the two balance counters C5, C6 and consists of the letters "N. B." signifying "no balance". This symbol is to be brought to the printing line in the event of the balance brought forward card being absent from its group. The asterisk symbol is placed in the "9" position and the symbol "N. B." in the "1" position on the asterisk type bars.

The asterisk type bars of the balance debit and balance credit printing banks associated with counters C5 and C6 are, in normal operation, arrested when the "9" position having an asterisk type is in position to print which occurs on the making of a pair of contacts P6 causing an impulse which is transmitted over the following circuit: From the positive line, through magnets 45a—45b controlling the asterisk bars of the printing banks associated with counters C5, C6, respectively, a switch 49, the contacts P6 (which close at the "9" time on the movement of a total printing shaft) and to the negative line.

When under "balance brought forward" control, however, the switch would be manually set to the dotted line position so as to direct the impulse from the positive line, through normally closed printing control relay contacts 50 to contacts P5 which close at the "1" position of the total printing shaft to arrest the asterisk type bar in "1" position for the printing of the symbol "N. B." Therefore the normal condition of this circuit in this case is to cause the printing of "N. B." unless the position of the relay contacts is altered by energization of an associated printing control relay magnet 51. When the position of the relay contacts is altered the switch 49 is disconnected from the contacts P5 and connected to the contacts P6 so that the impulse occurs at the "9" time and the bars are arrested in position to print an asterisk.

This change is brought into effect upon the passage of a "Y" punched "balance brought forward" card through one of the upper brushes 10c sensing a "Y" hole in column 68 (Fig. 4), which causes an impulse to pass over the following circuit: From the positive line through contacts L5, a reading brush 10c, a contact block, contacts L6 closed at the Y hole time in the cycle, a relay coil 52, a resistance 53, a Y distributor magnet 54, and the upper card lever contacts UCL2 to the negative line.

The energization of the relay magnet 52 causes the closure of its relay contacts 55 so that a holding circuit is set up which is maintained until near the end of the subsequent cycle when it is broken by cam contacts L10, opening immediately the zero hole position has been read. The energization of the distributor magnet 54 attracts an armature 56 to which is attached a rod 57 carrying pins 58 bearing against one of a pair of contacts 59. The movement of the rod 57 to the left causes the contacts 59 to close and a circuit is formed as follows: From the positive line 75 through a line 60, the contacts 59, a line 61, cam controlled contacts L11, which close at "1" on the subsequent cycle, a holding relay magnet 62, a resistance 63, the printing control relay magnet 51, a signal control relay magnet 106, cam contacts P7 and to the negative line 175.

The energization of the holding relay magnet 62 causes the closure of its relay contacts 64 and a holding circuit is formed which will remain closed until the end of the group, when, during the ensuing total printing cycle, the contacts P7 open.

Owing to the energization of the printing control relay magnet 51 the printing control contacts 50 have moved so that the magnets 45a and 45b controlling the positioning of the asterisk bars will be energized at the "9" time in the cycle and not at the "1" time in the cycle and an asterisk will be printed.

Between the left and right hand contacts of the switch A and the debit total and credit total counters C3 and C4 are introduced two further distributing switches E and F which in normal position deflect all impulses received through the switch A into either the debit or the credit total counter according to whether the amount is debit or credit, the actual selection of counters C3 and C4 being controlled by magnet 28.

When the distributor magnet 54 is energized owing to the passage of a "balance brought forward" card through the upper brushes the contacts 65 of the switches E and F are changed over so as to deflect the impulses from the switch A to either the debit balance brought forward counter C1, or the credit balance brought forward counter C2 depending on the setting of the switch A.

Towards the end of the passage of a "balance brought forward" card through the lower reading station, cam contacts L10 open breaking circuit for the distributor magnet 54 and allowing the switches E and F to return to normal. This will allow the remainder of the current cards being entered into the current debit or current credit counters C3, C4.

Thus, although it is preferred that the balance brought forward card should be at the head of the group, so as to allow a logical record to be obtained, the preferential treatment is still given even when, through one of a variety of causes, the card is in any other position than that desired.

The printed statement obtained for the six cards given above is shown in the upper part of Fig. 7, while the statement obtained for the five current cards, the "balance brought forward" card being absent, is shown in the lower part of this figure.

When the machine is adjusted as described above it runs continuously and if one or more "balance brought forward" cards are missing, as indicated by the symbols "N. B." adjacent the totals for the group or groups in question, these groups can be examined at the end of the tabulation to find the reason of the deficiency. It may, however, be desirable to rectify the absence of a "balance brought forward" card as soon as it is detected, and, to enable this to be done, the machine can be set to stop when it fails to detect a "balance brought forward" card in a group.

With this setting the switch 49 (Fig. 1) is moved to the position shown in full lines and a switch 109 (Fig. 1) is closed. When the machine fails to detect a "balance brought forward" card, neither of the magnets 51 and 106 is energized. The magnet 106 is arranged to open a normally closed pair of contacts 107 which are in a circuit extending from the line 75 through a signal relay control magnet 97, cam contacts L12 which close at the end of each card cycle, relay contacts 108, the contacts 107 and the switch 109 to the main line 175. The contacts 108 are controlled by the magnet 110 which, it will be remembered, is energized as the result of the functioning of the group control mechanism on a change of group. When the first card of a group passes the lower brushes, the contacts 108 are open and the contacts 107 are closed. When the "balance brought forward" card of this group passes the lower brushes, the magnet 106 is energized and opens the contacts 107 which remain open. Near the end of the last card cycle of this group, the magnet 110 is energized and closes its contacts 108 but the circuit through the magnet 97 is still interrupted at the contacts 107 and nothing happens although the contacts L12 close during said cycle. During the ensuing reset cycle the magnet 106 is deenergized by the opening of contacts P7. If there is no "balance brought forward" card in the group, the magnet 106 is not energized and the contacts 107 remain closed. Then, when the contacts 108 close as the result of a change in the group numbers and the normally open contacts L12 close towards the end of the last card cycle of the group, the circuit for the magnet 97 is completed and this magnet is energized.

The magnet 97 forms part of a signal device shown in Figs. 5 and 6. This device is enclosed in a casing having a window 111 and comprises a shaft 112 to which are secured a latching lever 113 and a lever 114. A shutter 115 which carries the legend "No balance" is secured to the levers 113 and 114 and the shaft is urged counterclockwise by a spring 116 having a tendency to bring the legend to the window. The lever 113 is normally engaged by a latching lug 117 of the armature 118 of the magnet 97, this armature being held in latching position by a spring 119. The lever 114 has a lug 120 which normally engages and holds the signal contacts 102 closed. These contacts are in the energizing circuit for the reset motor so that the latter cannot be started unless they are closed.

Figure 1:
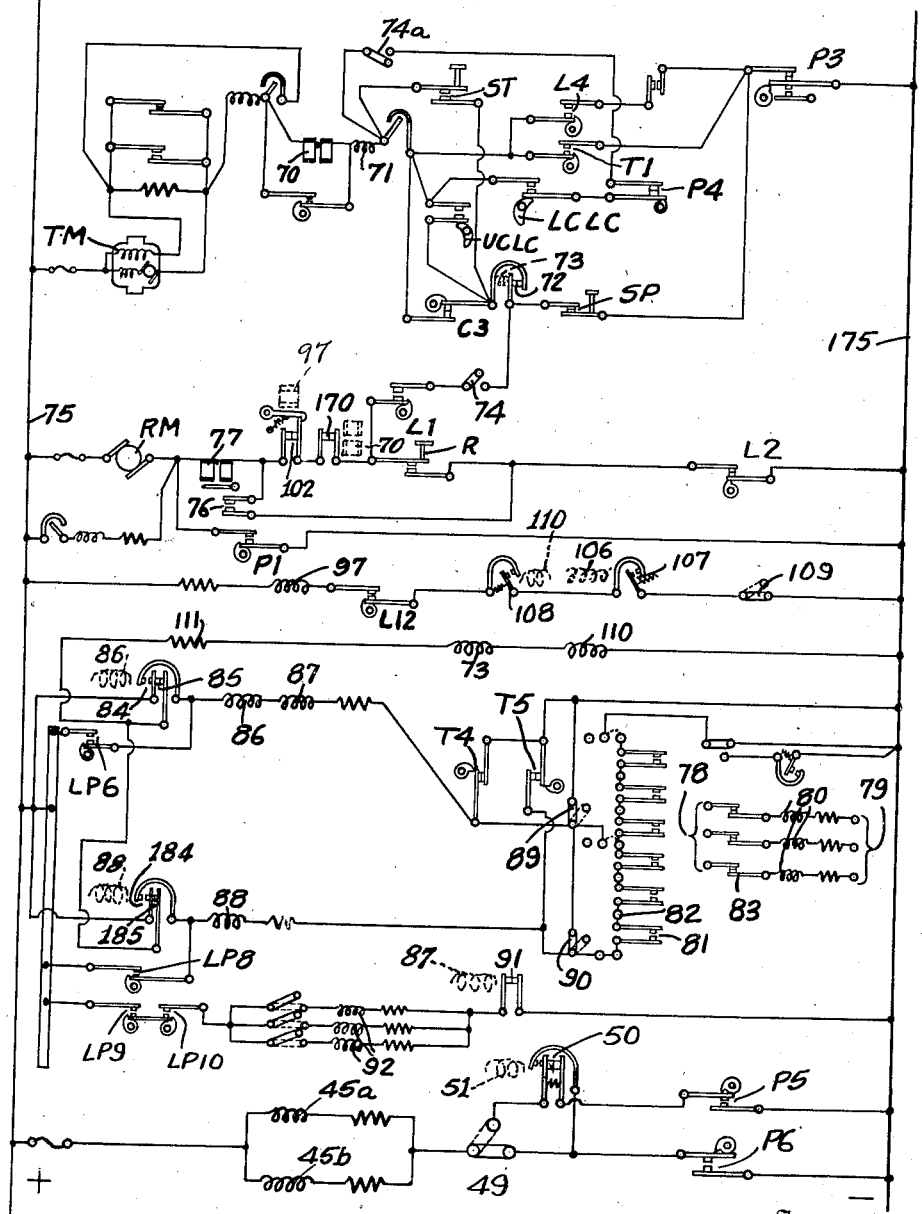

So long as a "balance brought forward" card is included in each group the magnet 97 is not energized, but, if such a card is absent from a group this magnet is energized and attracts its armature 118. The shutter is then unlatched and moved counterclockwise to bring the legend "No balance" to the window and to allow the contacts 102 to open. This completely stops the machine since the reset motor cannot be energized. The operator can then do whatever is necessary to rectify the absence of a "balance brought forward" card. To restore the reset circuit to normal a thumb piece 121 on the lever 114 is manually pressed thereby closing the contacts 102 after which the machine can be restarted by operating a reset key R (Fig. 1).

The machine can be operated in the usual way without "balance brought forward" or other special cards, by adjusting the switch 49 to its full line position and the switch 109 to its open (dotted line) position. If both switches are in their dotted line positions, the machine runs continuously printing "N. B." opposite the totals for each group which is without a "balance brought forward" card. If both switches are in their full line positions, the machine stops whenever a group is without a "balance brought forward" card, but the symbols "N. B." are not printed. Both methods of indicating the absence of a "balance brought forward" card can, if desired, be employed together by properly adjusting the switches but it will in general be sufficient to employ one or the other.

It will be understood that the present machine is provided with means for selectively printing the true balance from the balance counters C5 and C6 and suppressing the printing of the total on the counter containing the arithmetical complement of the balance. This mechanism is fully shown and described in Patent No. 1,950,475 and will be briefly described herein for sake of completeness.

In connection with this invention, counters having any desired number of register wheels may be used. The counters illustrated herein happen to have nine wheels. The balance counters are not used for balances that exceed seven digits, because the eighth or next to the last denominational order of each counter is used to indicate whether the balance be positive or negative when a total is to be printed. In the balance counters the eighth denominational order will always show a "9" if the number is a complement or a "0" if the number is a true balance. On the other counters the ninth order wheel receives the spill over from the eighth wheel whenever the eighth wheel accumulates ten units. On the balance counters the ninth wheel total is never printed as the switch 340 (Fig. 2) is opened on each balancing counter only.

Either the "0" on the eighth wheel of the true balance counter, or the "9" on the eighth wheel of the complementary counter may be used to control the printing of the true balance and the suppression of the complement. It is preferred to use the "9" on the eighth wheel of the counter showing the complement to cause the printing of the true balance and the suppression of printing of the complement, as follows: The total printing cam associated with the eighth denominational order of the debit balance counter C5 has a somewhat higher step at the "9" point for the purpose of controlling the selection of the counter from which the total is to be printed. As the total printing operation commences, cam contacts P15 (Fig. 2) close momentarily between the beginning of the cycle and the time when the impulse is normally received to print a "9" from any position on the counter. If, before the normal printing time, the extra high point closes total printing contacts 140 in the eighth denominational order of a net balance counter, it is an indication that a "9" appears on the eighth wheel of that counter and that the amount in that counter is a complement and not a true number.

In such case, a circuit is closed as follows: From left side of line through wire 316, contacts P15, plug socket 206, plug wire 207, plug socket 208 of the eighth denominational order of counter C5, total printing contacts 140, socket 179, plug wire 181, socket 177, through total selecting magnet 306 which opens contacts 224 and closes contacts 222, a resistance, and wire 308, to line wire 176. Current also flows through relay magnet 310 which closes contacts 312, thence through accompanying resistances and wire 308 to the right side of line. The closing of contacts P16 at this time establishes a holding circuit to hold magnet 306 energized until P16 opens at the end of the total taking cycle.

Providing that a "9" has appeared as above in the eighth denominational order of the debit balance counter C5, denoting that the counter contains a complement and therefore the credit balance counter C6 contains the positive balance, the total is printed from C6 by a circuit traced as follows: From left side of line through wire 39, wire 320, through contacts 222, wire 322, zero button contacts 324, total printing contacts 140, printing magnets 45, wire 332, contacts NL6, contacts LP6, wire 334, lower cam contacts P2 now closed, switch 336 and to right side of line. Counter C5 is reset to zero, but the printing of the complement therefrom is suppressed, due to the fact that the current feed to the printing magnets 45 of that counter was interrupted by the opening of contacts 224 when magnet 306 was energized.

If, however, at the beginning of the total-taking operation the contacts 140 in the eighth denominational order of the debit balance counter C5 fail to close while cam contacts P15 are closed it is an indication that counter C5 contains the true number which is to be printed. Magnet 306 will not become energized since total printing contacts 140 have not closed, contacts 224 will remain closed, contacts 222 remain open as in Fig. 2, and current will flow to the printing magnets 45 of the debit balance counter C5 from left side of line, wire 39, wire 320, contacts 224, zero button contacts 324, total printing contacts 140, magnets 45, contacts NL5 and LP5, wire 334, lower contacts P2, as before to right side of line. The printing of the total from the credit balance counter C6, which is of course a complement, is suppressed by the contacts 222 which remain open.

In the event that the total of the debit items has equaled the total of the credit items, the wheels of both the balance counters will of course show zeros. Under such circumstances no totals will be printed from the balance counters and the usual total-indicating asterisk will be printed by the printing banks associated with counters C5 and C6, providing that the balance card is present, otherwise the "N. B." sign will be printed as described.

Having now particularly described and ascertained the nature of the invention and in what manner the same is to be performed, I declare that what I claim is:

1. A machine of the class described comprising means for analyzing data designations in successively presented records, accumulating mechanism controlled thereby, means for printing totals standing on said accumulating mechanism including means for printing a special sign when totals are printed, an auxiliary analyzing device operative to detect the presence of a special designation in any record regardless of the order of occurrence of the record bearing said special designation, and means controlled by the auxiliary analyzing device for rendering the sign printing means ineffective to print the special sign on the occurrence of a record having the special designation.

2. In a machine controlled by records arranged in groups wherein may occur special records identified by a special designation, mechanism for accumulating data on said records under control thereof, total taking mechanism operable to take a total standing on said accumulating mechanism at the end of each group of records, means for sensing the presence of a special designation in a special record in any group irrespective of its position in the group, and means controlled by the sensing means for permitting a cycle of operation of the total taking mechanism on the occurrence of a special record in a group.

3. In an accounting machine controlled by records arranged in groups wherein may occur records identified by a special designation and having a special significance in the groups and indiscriminately located in the groups to which such records belong, total taking means, means for sensing the presence of said designation in a record of special significance in any group and adapted to so function irrespective of the location of such record in the group to which such record belongs, and means controlled by the special designation through the sensing means for preventing the total taking means from operating when a record of special significance is absent from any group.

4. In a machine controlled by records arranged in groups wherein may occur records of special significance having a special designation identifying them as such, total taking mechanism, a printing device operated by said mechanism and normally effective to print a special sign on a record sheet to indicate the absence of the record having the special designation from a group, and means controlled by said designation for rendering the printing device ineffective to print the special sign.

5. In an accounting machine controlled by records arranged in groups wherein may occur records identified by a special designation signifying that such records have a special significance, means for taking totals of items in said record groups, means for automatically initiating a total cycle of said total taking means at the end of each group, means for sensing the presence of said designation in any record of a group; a printing device adapted to be operated during a total taking operation to record one of two different signs, one signifying the presence of the designation in a group and the other for signifying its absence and normally operative to print the second sign; and means controlled by the sensing means for causing said device to print the first sign.

6. In a machine of the class described, means for sensing designations in control records successively presented in groups in which groups may occur records having predetermined designations, total taking means, a signal device adapted when operated to indicate the absence of the records having predetermined designations from a group, means for initiating operation of both the total taking means and signal device at the end of each group, and means controlled by the sensing means for preventing operation of the signal device when records having predetermined designations are present in the group.

7. In an accounting machine controlled by records arranged in groups some of which may have special records identified by predetermined designations, means for sensing said designations, a signal device adapted when operated to indicate the absence of special records from a group, means for automatically operating the signal device at the end of each group, and means controlled by the predetermined designations through the sensing means for preventing operation of said device when the special records are present in the groups.

8. In an accounting machine controlled by records arranged in groups identified by group classification designations, some of which groups may have special records identified by predetermined designations, a signal device adapted when operated to indicate the absence of special records from said groups, automatic group control mechanism for sensing changes in the classification designations, operating means whereby the group control mechanism tends to operate the signal device at the end of each group, an analyzing device adapted to sense said predetermined designations, and means controlled by the analyzing device for rendering the operating means ineffective.

9. In a machine controlled by records arranged in groups some of which contain special records identified by predetermined designations; a signal device for indicating the absence of said special records from any of the groups and comprising an indicator movable to a position to indicate the absence of such record from a group and electromagnetic means for controlling movement of the indicator; automatic group control mechanism; means whereby the automatic group control mechanism operates the electromagnetic means at the end of each group, and means controlled by the predetermined designations for preventing operation of the electromagnetic means when a special record is present in a group.

10. In a machine controlled by records arranged in groups wherein may occur special records identified by predetermined designations, accumulating mechanism, means for resetting the accumulating mechanism, means for automatically initiating operation of the resetting mechanism at the end of each group, means for sensing the predetermined designations, and means controlled by the sensing means for preventing the initiating means from taking effect when the special record is absent from any group.

11. In a machine of the class described, a record sensing brush for sensing successively presented records some of which records have means to distinguish them from other records, total taking means, including a special sign printing device operable to print two different signs, a control circuit for said device, means for variably controlling said circuit to cause one or the other of said signs to be printed, and means controlled by the distinguishing means through the sensing brush for controlling the variably controlling means.

12. In a machine controlled by records, some of which may have means to distinguish them from other records, means to take a total of the items on said records, a special sign printing device operable during each operation of the total taking means to print either of two special signs, means to selectively operate said device, and means controlled by the distinguishing means for controlling the action of the operating means whereby one of said signs is printed when the distinguishing sign is present in a record and the other sign is printed when the distinguishing means is absent.

13. In a record controlled machine, means to analyze records arranged in groups some of which groups have records with designations to distinguish such records from the others; means to feed records to the analyzing means, means to automatically stop said feeding means at the end of each group, total taking means including means to restart the said feeding means after the feeding of records has been stopped by the stopping means, and means controlled by the distinguishing designations through the analyzing means for preventing the operation of the total taking means and restarting means when the records with the distinguishing designations are absent from a group.

14. In a machine controlled by records arranged in groups some of which groups may have a special record with means to distinguish the special record from the other records, means to accumulate items under control of the records, means to stop the accumulating means at the end of a group of records, total taking means including means for restarting the accumulating means after accumulation has been stopped by the stopping means, means to prevent the total taking means and restarting means from being effective, and means controlled by the distinguishing means in the record for rendering the preventing means ineffective.

15. In a machine controlled by records arranged in groups some of which groups may have special records provided with means to distinguish the special records from the other records, said special records being liable to occur anywhere in the groups to which they belong, means to sense the distinguishing means in a special record irrespective of its order of occurrence in a group, means to indicate the absence of the special record from any group, means to cause the operation of the indicating means at the end of a group, and means controlled by the sensing means for preventing operation of the indicating means when the special record is present in a group.

16. In a machine controlled by records arranged in groups, some of which groups may contain records having means to distinguish them from the other records of the groups in which they may be present, means to record items under control of said records, means to stop operation of the recording means at the end of each group, total taking means including means to restart operation of the recording means after it has been stopped by the stopping means, and means controlled by the distinguishing means in the records for preventing the total taking means and restarting means from taking effect when no record bearing such distinguishing means is present in a group.

17. In a machine controlled by records arranged in groups in some of which groups may occur records having means to distinguish them from the other records in said groups, means to sense the distinguishing means, a driving motor; a circuit for said motor having means to close said motor circuit to start said motor and means to interrupt said circuit; a machine control circuit having means to operate the interrupting means for the motor circuit, means to close the machine control circuit at the end of a group, and means to interrupt the machine control circuit, and means controlled by the sensing means for operating the interrupting means in the machine control circuit when a record having the distinguishing means occurs in any group.

18. In a machine of the class described, means to sense data designations on successively presented records arranged in groups some of which groups may contain records having means to distinguish them from the other records, means to accumulate items under control of the records, means to take totals from the accumulating means, recording means controlled by the total taking means, an auxiliary recording device associated with the first recording means and arranged to record one of two different signs, one sign to indicate the presence in a group of a record having the distinguishing means and the other sign to indicate the absence of such record from a group supposed to contain such record, means to cause operation of both recording means at the end of each group, and means controlled by the distinguishing means through the sensing means for causing the auxiliary recording device to record the first sign when a record with the distinguishing means is present in a group and to record the second sign when such record is absent from a group.

19. In a machine of the class described, means to sense records some of which have means to distinguish them from other records, to which distinguishing means the sensing means is responsive; total taking means; a special sign printing device operated by the total taking means, including a circuit for controlling the printing device and means to close the said circuit at different times during each total taking cycle to cause the printing device to print one of a number of special signs, and means controlled by the sensing means for selectively controlling the time of closure of said circuit by the closing means.

20. In a record controlled machine the combination of total taking means, means to sense groups of records some of which groups may have records provided with means to distinguish them from other records, a signal device for indicating the absence of a record having the distinguishing means from a group, means to cause an operation of the signal means at the end of each group, and means controlled by the sensing means for preventing operation of the signal means when a record having the distinguishing means is present in the group.

21. In a record controlled machine, total taking means, means to sense records arranged in groups, some of which groups have records with means to distinguish them from other records, means to cause an operation of the total taking mechanism at the end of each group, means to prevent operation of the total taking means, and means controlled by the distinguishing means through the analyzing means for rendering the preventing means ineffective.

HAROLD HALL KEEN.